E. C. KETCHUM.
THRUST BEARING.
APPLICATION FILED APR. 3, 1909.

961,140.

Patented June 14, 1910.
2 SHEETS—SHEET 1.

Witnesses:
Howard Hanscom
Nathan C. Lombard

Inventor:
Ernest C. Ketchum,
by Walter E. Lombard,
Atty.

E. C. KETCHUM.
THRUST BEARING.
APPLICATION FILED APR. 3, 1909.

961,140.

Patented June 14, 1910.

2 SHEETS—SHEET 2.

Witnesses:
Howard Hanscom
Nathan C. Lombard

Inventor:
Ernest C. Ketchum,
by Walter E. Lombard,
Atty.

UNITED STATES PATENT OFFICE.

ERNEST C. KETCHUM, OF BOSTON, MASSACHUSETTS.

THRUST-BEARING.

961,140.

Specification of Letters Patent.

Patented June 14, 1910.

Application filed April 3, 1909. Serial No. 487,812.

*To all whom it may concern:*

Be it known that I, ERNEST C. KETCHUM, a citizen of the United States of America, and a resident of Boston, in the county of Suffolk and State of Massachusetts, have invented certain new and useful Improvements in Thrust-Bearings, of which the following is a specification.

This invention relates to thrust bearings and has for its object the production of a device of this class in which the friction between the various operating parts will be reduced to a minimum.

It consists in certain novel features of construction and arrangement of parts which will be readily understood by reference to the description of the drawings and to the claims hereinafter given.

Figure 1:
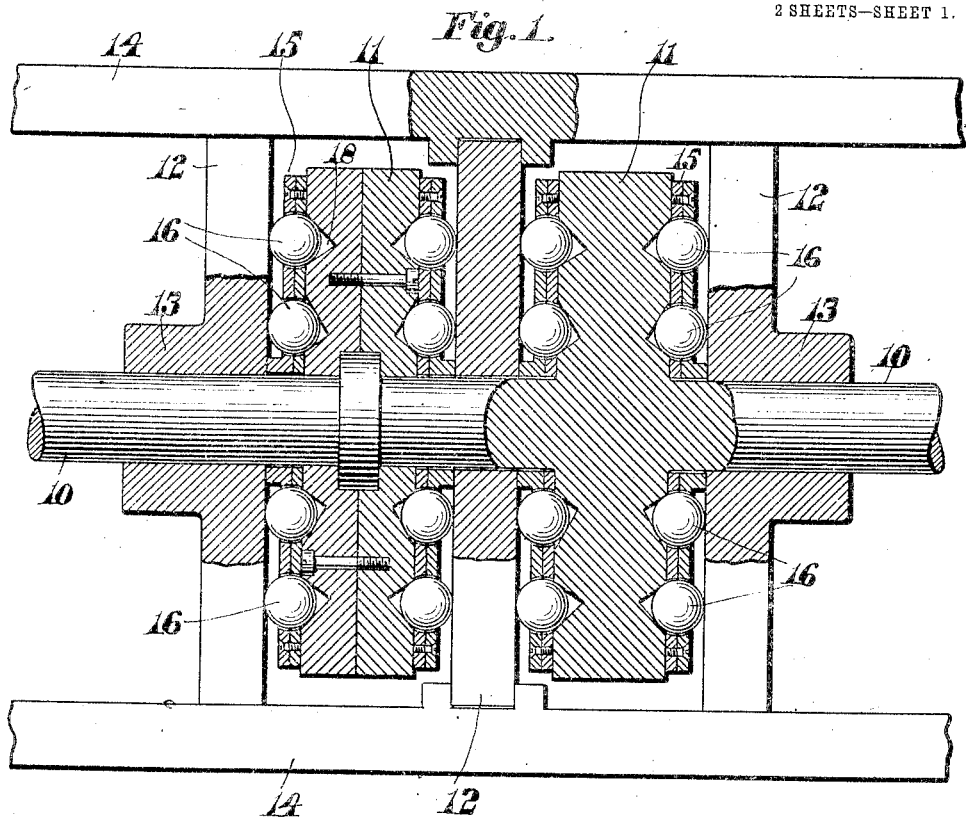
Figure 4:
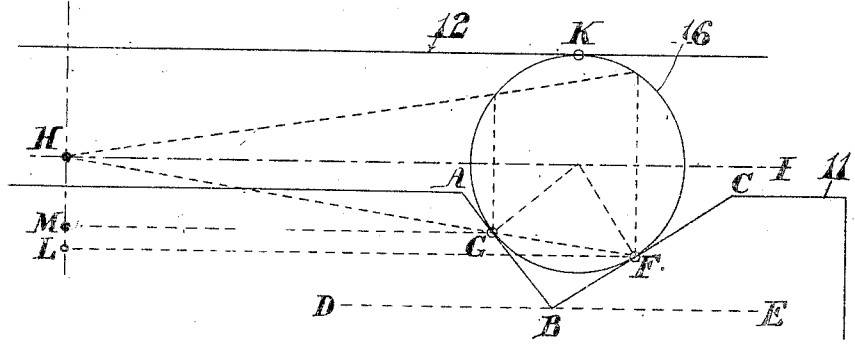
Figure 2:
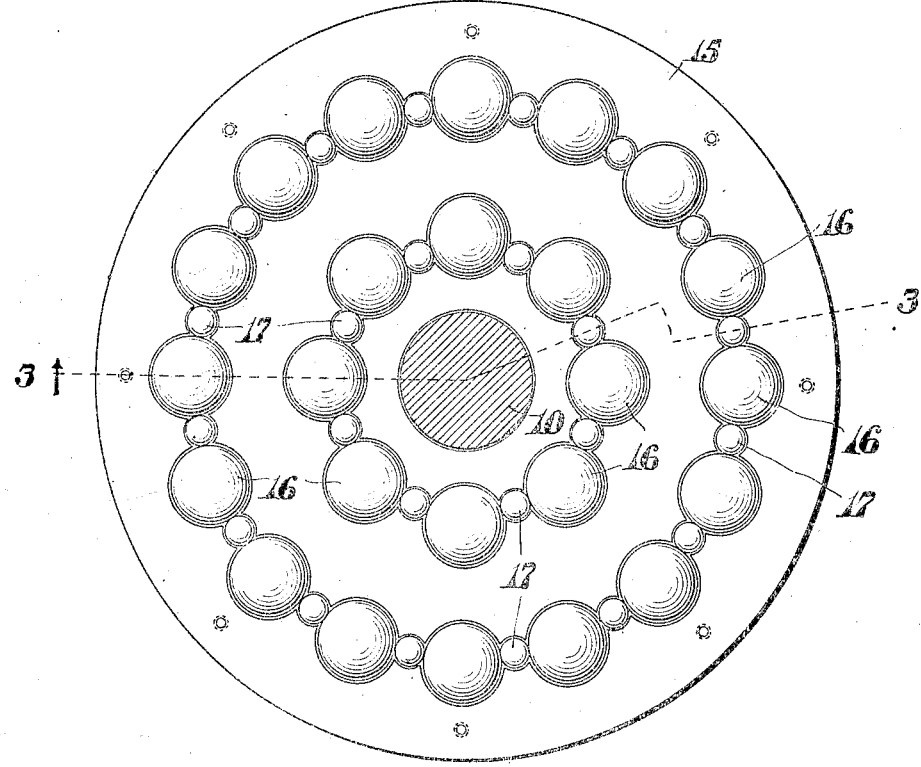
Figure 3:
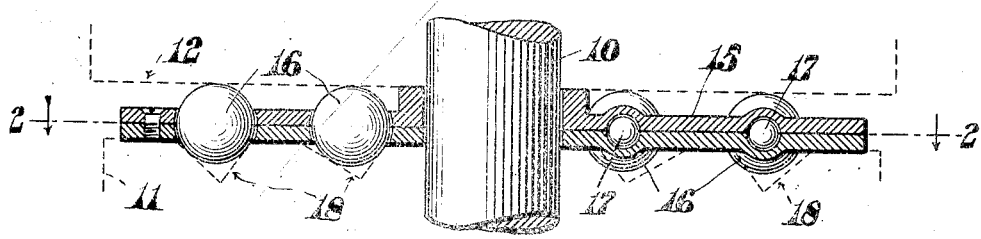

Of the drawings: Figure 1 represents a section of a thrust bearing embodying the features of this invention. Fig. 2 represents a section through the revoluble shaft thereof and showing in elevation the ball supporting cage, the same being drawn to an enlarged scale. Fig. 3 represents a section of the same, the cutting plane being on line 3—3 on Fig. 2, and Fig. 4 represents a diagram showing the method of forming the ball-supporting grooves.

Similar characters designate like parts throughout the several figures of the drawings.

In the drawings, 10 represents a revoluble shaft provided with a plurality of disk plates 11 which surround said shaft and are adapted to move longitudinally therewith. They may be formed integral with said shaft 10 or mounted thereon. These disk plates 11 are interposed between other plates 12 which surround said shaft 10 and are provided with bearings 13 in which the revoluble shaft 10 is adapted to rotate. The plates 12 are secured to a framework 14 of any desired construction in such manner that any movement of said plates 12 longitudinally of said shaft 10 is prevented.

Interposed between each disk plate 11 and the plate 12 adjacent thereto is a cage 15 in which is mounted a plurality of bearing balls 16 at different distances from the axis of said shaft 10, the preferred manner of positioning said balls being in two rows concentric to the axis of said revoluble shaft 10. The cage 15 also carries a plurality of separator balls 17, one of which is interposed between each pair of bearing balls 16, which extend beyond the outer face of the cage 15, and bear against the flat face of one of the fixed plates 12 and against the inclined bearing surfaces of the concentric grooves 18 formed in the opposite faces of the disk plates 11. When any thrust occurs in either direction, during the rotation of the revoluble shaft 10, it is taken up by means of the bearing balls 16 in contact with the fixed plates 12, the contacting surfaces being reduced to a minimum while at the same time they extend over the entire surface of the plates owing to the bearing balls being arranged at different distances from the axis of said shaft in a plurality of concentric rows and retained in position by means of the retaining cage 15. In order to further reduce the frictional contact between the plates and the bearing balls, the grooves cut into these plates are peculiarly formed with the inner bearing surface of each groove of a greater pitch than the outer bearing surface of said groove. By this construction of the grooves 18, all drag is obviated in the bearing balls 16 while rotating about their axes, as would be the case were the grooves 18 of ordinary V type owing to the difference in radii of the two points of contact of the bearing balls with the bearing surfaces of said grooves. As shown in Fig. 4 the inner bearing surface of the groove 18 is from A B while the outer bearing surface of said groove is from B C, and it is obvious that the angle of the various grooves varies with the distance that the grooves are located from the axis of the revoluble shaft 10.

The base line from which the various angles are measured is designated by the line D E.

F designates the point of contact of the ball 16 with the outer bearing surface B C while G designates the point of contact with the inner bearing surface A B and line H.

I designates the axis about which the balls 16 rotate during the rotation of the shaft 10.

K designates the point of contact with the face of one of the fixed plates 12.

It is evident, therefore, that each bearing ball 16 has three points of contact upon the two plates 11 and 12 between which it is interposed, which is obviously of great advantage. In order that there should be no drag upon the ball 16 during the rotation of the plate 11 about the axis of the shaft 10 and during the rotation of the ball itself about the axis H I thereof, it is desirable that the point of contact F should be a greater distance from the axis H I than the point of contact G and that these distances of the points F G from the axis H I should be proportionate to the distance that these points F G are from the axis of the shaft 10. In other words, the contact points F G of the bearing balls upon the bearing faces of the grooves 18 must be in a conical plane, the apex of which is at the intersection H of the axis H I about which the bearing ball 16 rotates and the axis of rotation of the shaft 10. It is evident therefore from an inspection of Fig. 4 of the drawings that the point of contact G on the inner bearing face A B is always on a line extending from the point of contact F on the outer bearing surface B C to the point H at the intersection of the axis of rotation of the ball 16 and the revoluble shaft 10.

In laying out accurately the angles of the groove 18 the size of the ball 16 first having been determined, the angle C B E is assumed according to the best judgment of the designer and the point of contact F as well. The ball 16 is then located on a line drawn through the contact point F at right angles to the bearing surface B C with the contact point K bearing against the face of the plate 12. The axis H I about which the ball 16 rotates is then located at right angles to the axis of the revoluble shaft and the line H F drawn. Where the line F H passes through the circumference of the ball 16 will be located the point of contact G and the bearing face A B will be tangential to the circumference of the ball 16. This operation will give the approximate location of the contact point G and the angles of the bearing faces of the groove 18. The angles of these faces may be verified and more accurately determined by trigonometry, if desired, the formula for determining the angle being found to be as follows:

Cosine A B D : cos. C B E : : M G : L F.

By constructing the grooves 18 in the manner described with the bearing face A B of greater pitch than the bearing face B C and determining accurately the contact points thereon so that the contact point G will always be on a line extending from the contact point F to the intersection of the axis of the revoluble shaft and the axis of rotation of the bearing ball, a perfect rotation of the ball is secured about the axis of rotation H I.

It is believed that the operation and many advantages of the invention will be thoroughly understood from the foregoing.

Having thus described my invention, I claim:

1. In a device of the class described, the combination with a revoluble shaft; of two plates, one of which moves longitudinally with said shaft while the other is prevented from such longitudinal movement and one of which is provided with a plurality of concentric grooves; a cage interposed between said plates comprising two plates secured together, each having a plurality of openings therethrough, and a plurality of semi-spherical depressions on its inner face intermediate said openings, said openings and depressions registering with similar openings and depressions in the other plate; a plurality of balls in said openings extending beyond the outer face of said plates and bearing upon the walls of said grooves of one plate and the flat face of the other plate; and a separator ball in the cavity formed by two opposing depressions when the plates of said cage are assembled.

2. In a device of the class described, the combination with a revoluble shaft; of two plates, one of which moves longitudinally with said shaft while the other is prevented from such horizontal movement and one of which is provided with a plurality of concentric grooves; a cage interposed between said plates comprising two plates secured together, each having a plurality of openings therethrough arranged concentrically to said shaft, and a plurality of semi-spherical depressions on its inner face intermediate said openings with the centers thereof in a line with the centers of the openings on each side thereof, said openings and depressions registering with similar openings and depressions in the other plate; a plurality of balls in said openings extending beyond the outer face of said plates and bearing upon the walls of said grooves of one plate and the flat face of the other plate; and a separator ball in the cavity formed by two opposing depressions when the plates of said cage are assembled.

Signed by me at 4 Post Office Sq., Boston, Mass., this 24th day of March, 1909.

ERNEST C. KETCHUM.

Witnesses:
WALTER E. LOMBARD,
EDNA C. CLEVELAND.